United States Patent
Mozayeni

Patent Number: 5,830,360
Date of Patent: Nov. 3, 1998

[54] POUR THROUGH AND PITCHER MOUNTED WATER FILTER FOR REMOVAL OF PARASITE CYSTS, BACTERIA AND VIRUSES AND METHOD OF FILTRATING WATER

[76] Inventor: B. Robert Mozayeni, 11412 Luxmanor Rd., Rockwville, Md. 20852

[21] Appl. No.: 641,762

[22] Filed: May 2, 1996

[51] Int. Cl.⁶ .................... B01D 1/00; B01D 24/00
[52] U.S. Cl. .................. 210/651; 210/285; 210/286; 210/473; 210/477; 210/266; 210/321.75
[58] Field of Search ................... 210/321.74, 321.83, 210/282, 280, 493.1, 493.4, 493.5, 263, 477, 651, 321.85, 321.76, 321.75, 497.1, 764, 285, 286, 266, 473

[56] References Cited

U.S. PATENT DOCUMENTS

| | | | |
|---|---|---|---|
| 385,440 | 7/1888 | Birkery | 210/285 |
| 3,434,599 | 3/1969 | Wischmeyer et al. | 210/494.1 |
| 3,827,562 | 8/1974 | Esmond | 210/304 |
| 3,872,013 | 3/1975 | Nishino et al. | 210/502.1 |
| 4,092,246 | 5/1978 | Kummer | 210/497.1 |
| 4,642,192 | 2/1987 | Heskett . | |
| 4,769,143 | 9/1988 | Deutsch et al. | 210/266 |
| 4,816,149 | 3/1989 | Wekell | 210/257.2 |
| 4,877,527 | 10/1989 | Browhell | 210/497.1 |
| 5,006,267 | 4/1991 | Vaughn et al. | 210/764 |
| 5,076,922 | 12/1991 | DeAre | 210/282 |
| 5,116,500 | 5/1992 | Ceaton | 210/238 |
| 5,122,274 | 6/1992 | Heskett . | |
| 5,135,654 | 8/1992 | Heskett . | |
| 5,173,179 | 12/1992 | DeVoe et al. | 210/280 |
| 5,198,118 | 3/1993 | Heskett . | |
| 5,205,932 | 4/1993 | Solomon et al. | 210/284 |
| 5,269,919 | 12/1993 | Von Medlin | 210/282 |
| 5,269,932 | 12/1993 | Heskett . | |
| 5,275,737 | 1/1994 | Heskett . | |
| 5,300,224 | 4/1994 | Farley | 210/282 |
| 5,308,482 | 5/1994 | Mead | 210/207 |
| 5,314,623 | 5/1994 | Heskett . | |
| 5,338,450 | 8/1994 | Maurer | 210/493.4 |
| 5,401,399 | 3/1995 | Magnusson et al. | 210/136 |
| 5,407,573 | 4/1995 | Hughes | 210/266 |
| 5,411,661 | 5/1995 | Heiligman | 210/264 |
| 5,415,770 | 5/1995 | Heskett . | |
| 5,433,856 | 7/1995 | Heskett . | |
| 5,510,027 | 4/1996 | Teteda | 210/282 |
| 5,510,034 | 4/1996 | Heskett . | |
| 5,552,058 | 9/1996 | Fanning | 210/669 |
| 5,580,447 | 12/1996 | Patter et al. | 210/282 |
| 5,599,454 | 2/1997 | Heskett . | |
| 5,653,878 | 8/1997 | Reid | 210/266 |

*Primary Examiner*—Ana Fortuna
*Attorney, Agent, or Firm*—Lowe Hauptman Gopstein Gilman & Berner

[57] ABSTRACT

A gravity fed, pour-through water filtration device includes a chamber housing a spiral filter including a biocidal material and an annular holding chamber. Several porous separator disks, a volume of filtration media, and a cyst membrane are positioned beneath the spiral filter and holding chamber. The device is effective in significantly reducing the number of bacteria, viruses and cysts present in the filtrated water.

41 Claims, 4 Drawing Sheets

POUR THROUGH AND PITCHER MOUNTED WATER FILTER FOR REMOVAL OF PARASITE CYSTS, BACTERIA AND VIRUSES AND METHOD OF FILTRATING WATER

TECHNICAL FIELD

This invention relates to a portable water filtration device which can be inserted into and used with a water pitcher and more particularly, to a device and method utilizing filtration materials for removing microbiological, pesticidal and cyst substances in a gravity pour through unit. While the device of the present invention has features making it optimal for use in a pour-through unit, the device may be particularly useful in a pressurized water line or otherwise, such as in a manually pumped water filter.

BACKGROUND ART

Many types of contaminants are found in water, and often central water treatment plants fail to adequately remove all contaminants. For instance, herbicides, pesticides and PCB's, chemicals applied to land or used in industries, may enter drinking water as a result of misapplication, spills or industrial discharge. Inorganic compounds, occurring naturally in the environment, may enter water as they pass through rock or soil. Organic compounds may end up in the drinking water as a result of misapplication of agricultural chemicals, spills, or industrial discharge during manufacturing.

Of more concern are bacteria, viruses and parasite cysts that survive the community water treatment. Bacteria and viruses may be harmful or toxic, while parasite cysts may cause disease with symptoms of severe abdominal cramping and diarrhea if ingested. The most common cysts are *Giardia lamblia* and *Cryptosporidium* which are excreted by animals. These two cyst types are sometimes found in drinking water systems which use surface water as the primary source.

There are many proposed portable filtration devices in the prior art of which I am aware. Various point-of-use pour through filters are currently on the market, which claim some bacteriological reduction, but are primarily intended to improve the aesthetic concerns in the water, i.e., taste, odor and/or color.

U.S. Pat. No. 5,076,922 to DeAre discloses a filtration apparatus for use with a water pitcher. The filter is filled with a combination of conventional resin and activated carbon which attracts lead and chlorine to improve the taste and quality of the water. However, this type of filter may not effectively reduce bacteria, viruses and cysts.

A portable potable water purifier kit is disclosed in U.S. Pat. No. 5,116,500 to Ceaton. The water traversing the filter encounters anthracite and an ion exchange material before entering a spiral structure containing activated carbon.

U.S. Pat. No. 5,308,482 to Mead discloses portable water purifying device intended to kill both bacteria and viruses. The filter provides a microbicidal resin, specifically, iodine, in a flow path which increases contact time of the water with iodine, and a holding reservoir to expose water to iodine, and a post-filter volume of activated charcoal. The reference fails to disclose removal of cysts.

Generally, pressurized water purification devices are more effective in reducing bacteria, viruses and cysts. For example, U.S. Pat. No. 5,205,932 to Solomon et al. discloses an in-line, pressure driven water purification canister including five sequential stages of bacteriostatic purification, each employing a respective medium: polymer-bead, copper-zinc alloy, magnesium dioxide, anion ion-exchange resin, and activated carbon. The water treatment combination is hostile to bacterial growth and either removes or significantly reduces the amount of organic and inorganic contaminants in the water. Similarly, U.S. Pat. No. 5,407,573 to Hughes discloses a water filter disposed in-line in a water delivery pipe. The filter includes a plurality of aligned chambers. The water passes through a first chamber containing a biocidal material such as iodine and into an extended contact time chamber to allow further contact time between the biocide and any microorganisms in the water. The water then passes through a biocide removal chamber, a chamber containing bacteriostatic media, and a cyst membrane screen. These devices are not portable and are not suited for pour-through use with, for example, a water pitcher.

Accordingly, it is an object of the invention to provide an improved pour through and pitcher mounted water filter.

Another object of the invention is to provide an improved portable water filter adapted for use with a pitcher.

Yet another object of the invention is to provide an improved water filter for removal of parasite cysts, bacteria and viruses.

A further object of the invention is to provide an improved water filter permitting an extended path of contact with biocidal substances.

Another object of the invention is to provide a unique cycling of reduction oxidation which may be substantially more effective in killing bacteria and viruses.

Yet another object of the invention is to provide an improved method of filtrating water resulting in significant removal of parasite cysts, bacteria and viruses.

A further object of the invention is to provide an improved method of filtrating water providing a fluid path which disrupts laminar flow, making the method useful in preventing the accumulation of biofilm, both in the filter and generally in water lines, and in generally improving the efficacy of the biocidal material by increasing its contact with the water to be purified.

DISCLOSURE OF THE INVENTION

These and other objects are achieved by the water filter and method of filtrating water of the present invention.

The present invention provides a filter for purifying a liquid such as water. The filter includes a housing having an inlet through which the liquid is received and an outlet. A spiral filter structure includes a ribbon spirally or helically wound in a clockwise or counterclockwise direction to form a central hollow core and an exit at one spiral end thereof. The ribbon has adherent various biocidal granules. The housing inlet directs the liquid through the spiral or helical filter structure via the central core, and the liquid exits the spiral or helical structure at the end of the spirally wound ribbon. Alternately, the filter structure may be formed of layered concentric cylinders or horizontal layers. An annular holding chamber, adapted to receive liquid exiting the spiral structure, is disposed between the spiral filter structure and the housing. The annular holding chamber includes a plurality of outlet holes. A volume of filtration media is provided through which the liquid is passed, after exiting the holding chamber through the plurality of outlet holes. The liquid flows in contact with the filtration media and exits the housing via the outlet.

Preferably, the biocidal substance includes a copper-zinc alloy, or iodine, or both. If the biocidal substance is both a copper-zinc alloy and iodine, it is preferred that the copper-zinc alloy and iodine be repeatedly alternatingly secured to the ribbon, or that the copper-zinc alloy is secured to approximately half of the ribbon and the iodine is secured to a remainder of the ribbon. If layered, alternating spaces may contain either a copper-zinc alloy or iodine.

Also preferably, the ribbon is made of polyethylene or other inert, rigid material capable of supplying the active granules and being wound or molded into a spiral or helix, and the filtration media includes activated charcoal.

According to one aspect of the invention, a lower portion of the exterior of the spiral filter structure forming the exit is sealed to the spiral filter structure such that the spiral filter structure forms a sediment trap and causes the level of fluid in the channel of the spiral filter to be higher and thereby minimize the volume of air contained in the fluid path.

An upper porous separator disk, preferably formed of porous polyethylene, may be disposed between the annular holding chamber and the volume of filtration media.

A diffuser screen may also be disposed between the separator disk and the annular holding chamber. The diffuser screen distributes the liquid entering the volume of filtration media through the plurality of outlet holes over the entire surface area of the screen.

Preferably, the volume of filtration media is contained between upper and lower separator disks.

It is preferred that a cyst membrane, formed of a porous polycarbonate material, be provided beneath the volume of filtration media. Preferably, the porous material includes a plurality of pores of a diameter of 3 microns or less.

According to another preferred embodiment of the present invention, the spiral or helical filter structure may be replaced with a helical structure.

Also preferably, the filter is of a pour-through type disposed in a pitcher.

The present invention also provides a method for filtering a liquid such as water. The liquid is introduced into a filter such that the liquid traverses a lengthy path in intimate contact with at least one cycle of first and second biocidal materials. Upon leaving the filter, the liquid is contained a holding chamber and routed through a volume of filtration media. Preferably, the liquid is then passed through a cyst membrane.

According to a preferred embodiment, the first and second biocidal materials are selected to provide a rapid fluctuation reduction-oxidation cycle, wherein the reduction-oxidation cycle kills microbes present in the liquid.

Preferably, the first and second biocidal materials are a copper-zinc alloy and iodine, in either order, consecutively or in alternating succession.

According to one preferred embodiment, the lengthy path is provided by utilizing a spiral filter structure including a ribbon spirally wound clockwise or counterclockwise to form a central hollow core and an exit at the exterior thereof, in which case the first and second biocidal materials are held in place by the and the liquid enters the filter at the central core and exits the spiral filter structure at the exit to enter the holding chamber.

According to another preferred embodiment, the lengthy path is provided by utilizing a helical filter structure including a ribbon spirally wound and including an inlet and an exit at the exterior thereof. The first and second biocidal materials are held in place by the ribbon, and the liquid enters the filter at the inlet and exits the spiral filter structure at the exit to enter the holding chamber.

According to yet another preferred embodiment, the lengthy path is provided by utilizing a helical filter structure including a ribbon helically wound and including an inlet and an exit at the exterior thereof, in which case the liquid flows radially. The first and second biocidal materials are held in place by the ribbon, and the liquid enters the filter at the inlet and exits the spiral filter structure at the exit to enter the holding chamber. Alternatively, the lengthy path may be provided by concentric cylindrical layers or horizontal layers, in which case the liquid flows linearly.

The present invention also provides a reduction-oxidation or an oxidation-reduction method for killing biological organisms. The biological organisms are exposed to a first biocidal material for a period of time, with the first biocidal material increasing or decreasing the number of electrons surrounding the biological organisms. The biological organisms are then exposed to a second biocidal material for a period of time, the second biocidal material decreasing or increasing the number of electrons in the biological organisms. The cyclical increase and decrease in the number of electrons in the immediate environment of the biological organisms kills the biological organisms.

Preferably, the first biocidal material is a copper-zinc alloy, and the second biocidal material is iodine.

The present invention is further directed to a method of manufacturing a filtrating element. A ribbon support substrate is provided, on which is disposed adhesive on selected areas of the substrate. At least one of a biocidal material and a pesticide is caused to contact the adhesive to adhere to the substrate.

The adhesive may be disposed on only one side of the substrate, or on both sides of the substrate.

The method of manufacture may further comprise the step of spirally or helically winding the substrate so as to form a spiral structure such that only the biocidal material and the pesticide limits contact of one winding of the substrate to the next consecutive winding of the substrate.

Yet another aspect of the invention is in providing a method of manufacturing a filtrating element, comprising the steps of providing a ribbon support substrate, spirally winding the substrate to form a spiral structure with gaps formed between each winding of the substrate and the next consecutive winding of the substrate, and spraying or otherwise filling at least one of a biocidal material and a pesticide into the gaps. Alternatively, the ribbon support structure may be wound helically to form a helical structure with gaps formed between each winding of the substrate and the next consecutive winding of the substrate, the gaps being filled with at least one of a biocidal material and a pesticide.

BEST MODE FOR CARRYING OUT THE INVENTION

FIGS. 1–5 constitute an illustration of one embodiment of a water filtration device 10 according to the present invention which is effective in killing bacteria and viruses and removing cysts. As will be described in more detail below, the device 10 includes a unique spiral or helical filter 30, 80, preferably including a first portion containing a first biocidal material followed by a second portion containing a second biocidal material. By utilizing a copper-zinc alloy and iodine as the first and second biocidal materials, the spiral or helical filter advantageously provides a unique reduction-oxidation cycle in which it is difficult for biological organisms to survive.

Water filtration device 10 also advantageously includes a volume of filtration media 64, such as activated charcoal and/or ion exchange resins to remove lead and other heavy metals, chlorine, pesticide and organics and act as an agent for water softening. Also provided in device 10 is a cyst membrane 70 for removing parasite cysts from the water.

Figures 2, 3:
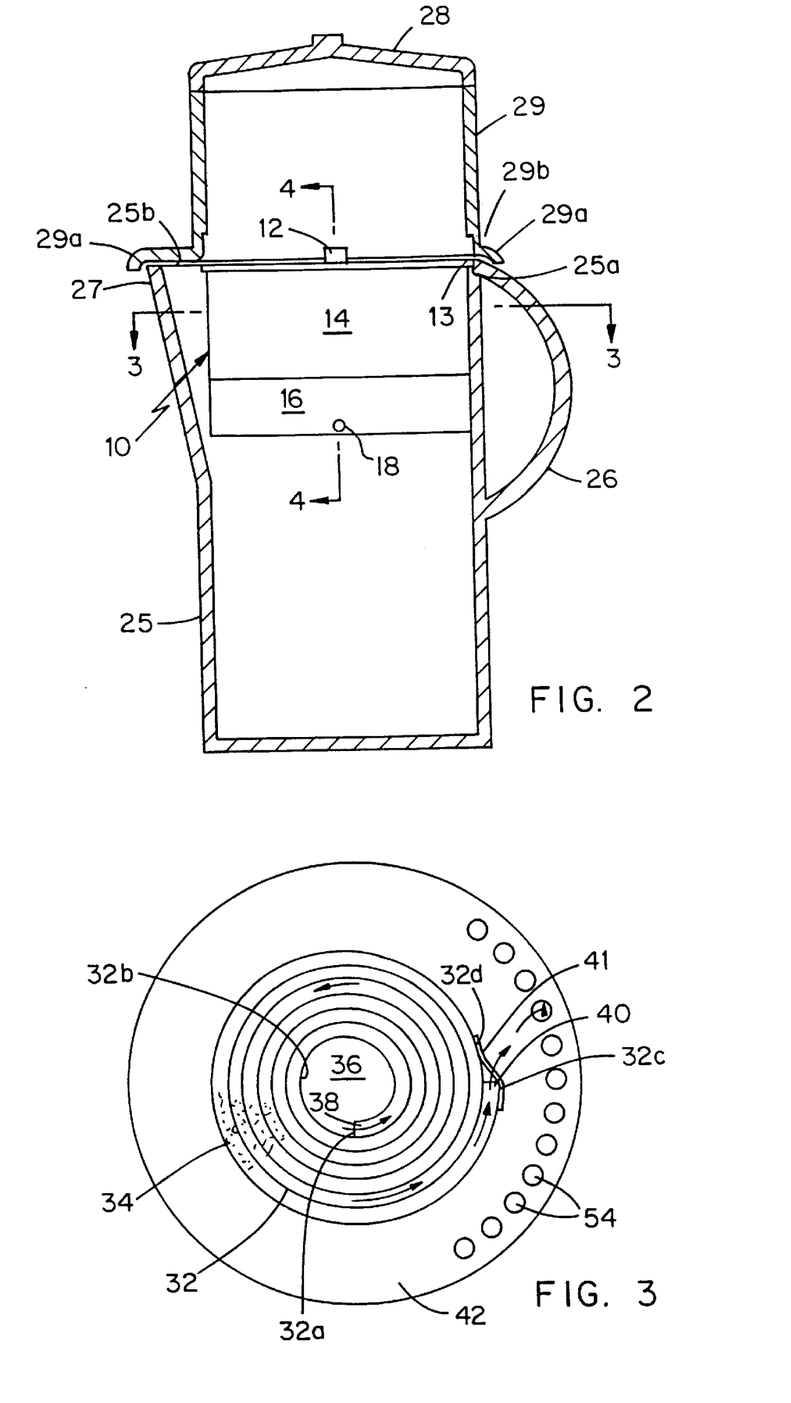
FIG. 2 is a schematic cross-sectional view of the water filtration device inserted into a pitcher.
FIG. 3 is a cross-sectional view taken, along lines 3—3 of FIG. 1.

These unique features of device 10 of the present invention are compactly arranged to provide a gravity fed, pour-through filter, especially suited for use with a water pitcher, as depicted in FIG. 2. Water entering the device through an inlet 12, flowing through spiral or helical filter 30, 80 in intimate contact with the biocidal materials, and traversing the volume of filtration media and the cyst membrane, exits the outlet 20 of the device with significantly reduced levels of potentially toxic organisms commonly found in water.

The unique configuration of spiral or helical filter 30, 80 also advantageously prevents the fluid traversing the filter from achieving laminar flow therethrough. The filter 30, 80 is generally made of a ribbon or other surface with biocidal materials disposed thereon wound into the spiral or helical filter shape. The resulting channel through which the fluid travels includes mechanical and physical properties that create turbulence, thereby impeding laminar flow which is hospitable to the growth of bacteria on the channel surface. The resulting filter is more toxic to bacteria, and thus the turbulence created by the filter maximize the bacteriocidal effect of the biocidal resin. It will be appreciated that this aspect of the invention may be adapted for use as an in-line filter, either by lining the surface of the conduit with a biocidal material or by providing a filter in, for instance, a distal end of the water line.

Figure 1:
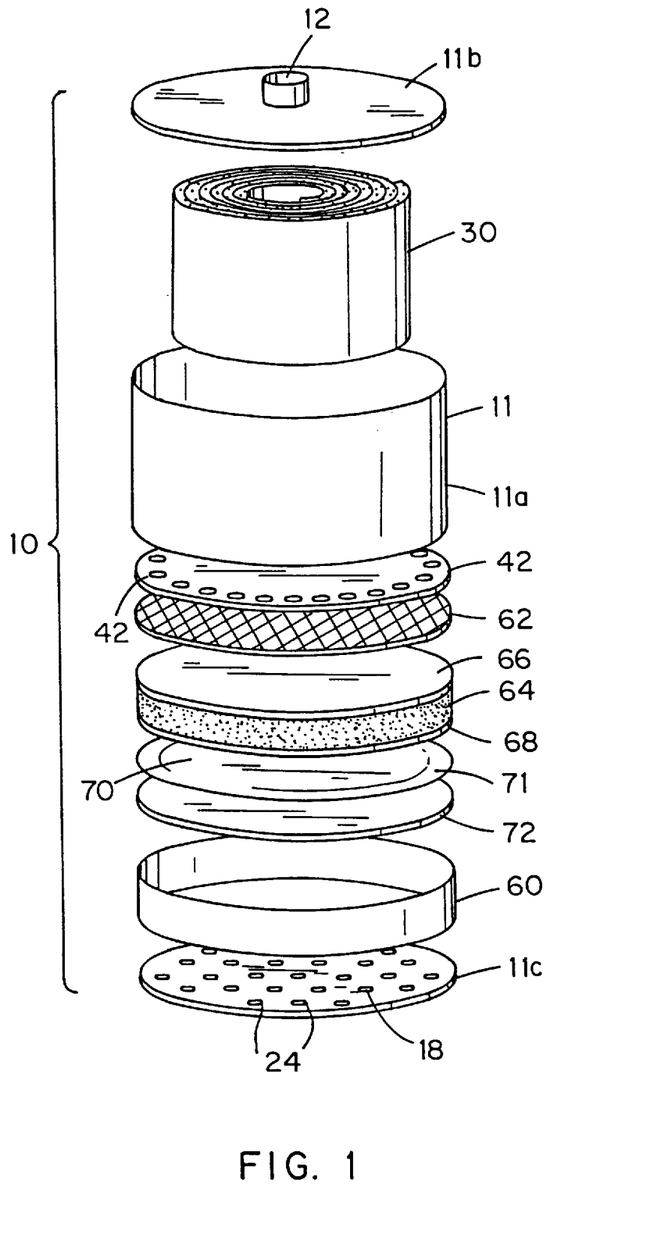
FIG. 1 is an exploded perspective view of the water filtration device according to the present invention.

More specifically, with particular reference to FIG. 1, water filtration device 10 includes inlet 12, a housing 11 and an outlet 18. Housing 11 generally includes an outer circumferential wall 11a, an upper surface 11b, and a lower surface 11c. Outlet 18 may be a hole 20 secured to an outlet tube, as depicted in FIG. 2, or alternately, outlet 18 may be a plurality of holes 24 in lower surface 11c, as shown in FIG. 1.

Referring to FIG. 2, the water filtration device 10 is depicted installed in a pitcher 25. Pitcher 25 may be any conventional pitcher, and generally includes a handle 26, spout 27 and lid 28. Device 10 is positioned such that water entering device 10 at inlet 12 must traverse the device before entering pitcher 25 via outlet 18. Thus, device 10 is commonly referred to in the industry as a pour-through unit. Device 10 may be maintained in position within pitcher 25 in any suitable and convention manner. One example is depicted in FIG. 2, where housing 11 of device 10 includes a lip 13 which can rest in a circumferential cut-out 25a of upper edge 25b of pitcher 25. Alternative means of maintaining device 10 in position within pitcher 25 may include, for example, a filter holder formed in pitcher in which the device 10 is received, or a stand contacting the bottom of the pitcher for supporting device 10.

Preferably, pitcher 25 includes a detachable reservoir 29 which rests on upper edge 25b pitcher 25 on which lid 28 rests. Water is received in reservoir 29, travels through inlet 12 to device 10. Reservoir 29 advantageously includes a lip 29a circumferentially disposed about the lower surface 29b of reservoir 29. Lip 29a prevents untreated water from entering pitcher 25.

For convenience of description, the filter will be described as divided into an upper chamber 14 and a lower chamber 16, with upper chamber 14 housing the spiral filter 30 and lower chamber 16 containing, inter alia, the volume of filtration media 64 and the cyst membrane 70. As depicted in FIG. 1, upper chamber 14 is contained by outer circumferential wall 11a, while lower chamber 16 is housed by a lower housing 60. However, it is to be understood that it is not required that the filter be physically divided into chambers 14, 16, and the present invention encompasses both a device physically divided into chambers for ease of manufacturing and a device including a housing within which the filter components are disposed.

Figure 6:
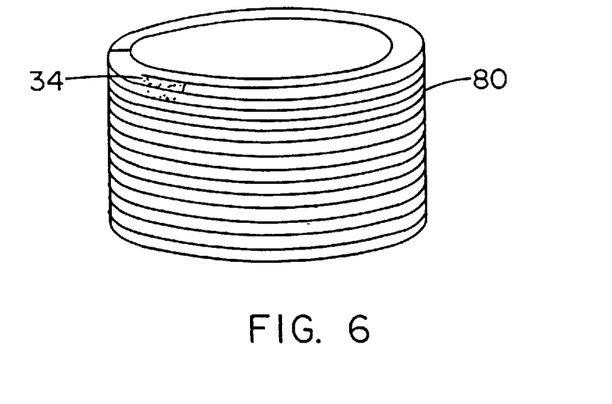
FIG. 6 is a perspective view of an alternate embodiment of the filter of the present invention.

As will be described in greater detail below, spiral filter 30 is formed of a ribbon 32 on which is secured a biocidal material 34. Spirally winding ribbon 32, in either a clockwise or counterclockwise direction, results in the spiral structure 30, best seen in FIG. 3. Alternatively, ribbon 32 may be helically wound and sealed at its edges, resulting in the helical structure 80 as depicted in FIG. 6. When spirally winding ribbon 32, a space is left in the innermost portion thereof, forming a central hollow core 36. The gap between the innermost edge 32a of ribbon 32 and the next adjacent winding 32b of ribbon 32 forms a filter inlet 38. At the other end of ribbon 32, a lower portion of outermost edge 32c of ribbon 32 is sealed to the previous adjacent winding 32d to form an exit 40, as described below.

Figure 4:
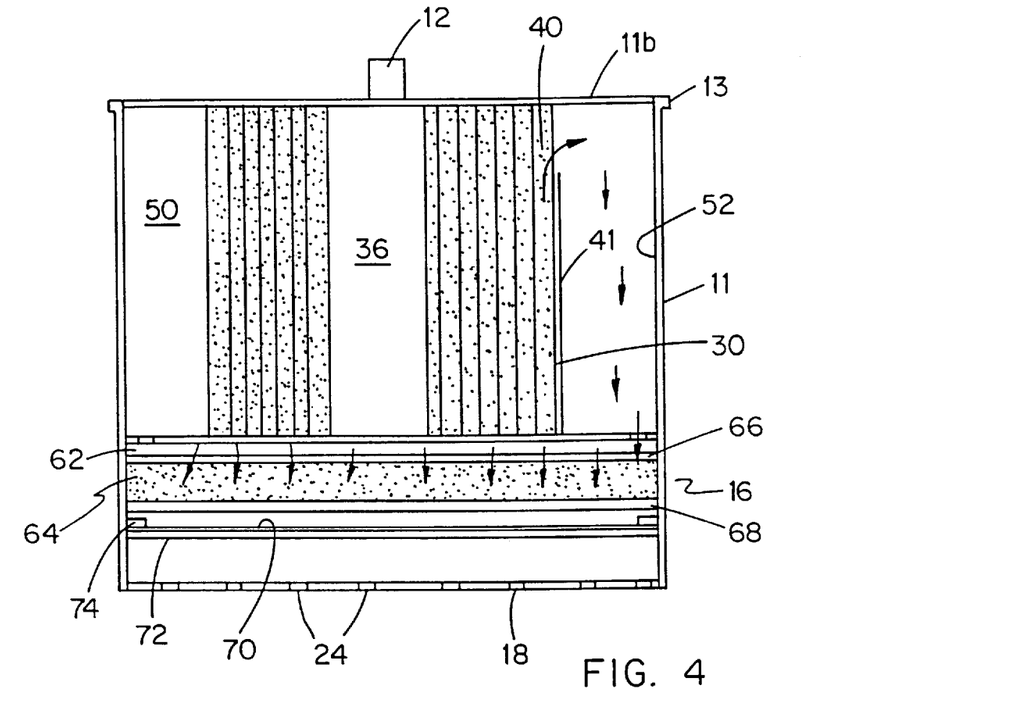
FIG. 4 is a cross-sectional plan view taken along lines 4—4 of FIG. 1.
Figure 4A:
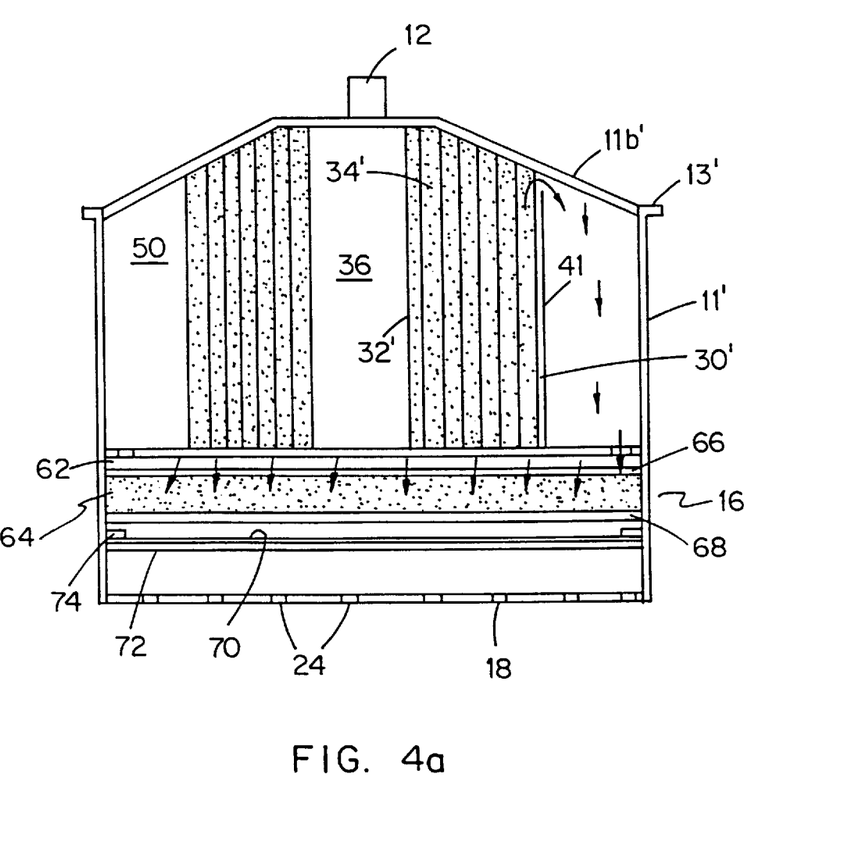
FIG. 4a is a cross-sectional plan view, similar to FIG. 4, of an alternate embodiment of the water filtration device according to the present invention.

Referring to FIG. 4a, yet another embodiment of the spiral filter is depicted as filter 30'. As with filter 30, filter 30' is formed of a ribbon 32' on which is secured a biocidal material 34'. The upper surface 31' of filter 30' is conical in shape, and the upper surface 11b' of housing 11b' is likewise conical in shape. This configuration advantageously results in better fluid flow through the filter, as locking or trapping of air in the filter is less likely to occur because of the conical shape. Similarly, the bottom may be made to be conical, concave with the apex in the center. This would allow the liquid to flow under gravity toward the outside of the spiral.

Spiral filter 30 is disposed inside housing 11 in contact with upper surface 11b and a lower support plate 42. Upper and lower edges 30a, 30b of spiral filter 30 are covered with food grade epoxy or silicone, and the spiral filter 30 is compressed against both lower support plate 42 and upper surface 11b. This effectively seals spiral filter 30 at its upper and lower surfaces to prevent seepage of water from the filter.

Water entering the filtration device 10 from outlet 18 is introduced into the central hollow core 36 of spiral filter 30. Because spiral filter 30 is sealed at its upper and lower edges 30a, 30b, water is forced to enter the spiral filter 30 at filter inlet 38 and traverse the entire length of the wound ribbon 32 before exiting the spiral filter 30 at exit 40. Preferably, as best seen in FIG. 4, at least the lower half, and preferably the lower 4/5ths, of outermost edge 32c of ribbon 32 is sealed to the previous adjacent winding 32d, so that exit 40 is limited to the upper, unsealed portion of spiral filter 30. The sealing is accomplished, for instance, by providing a length of tape 41, covering both outermost edge 32c and the previous adjacent winding 32d. Alternately, an adhesive such as epoxy may be applied to the lower portion of outermost edge 32c. Because water is thus forced to exit the filter at the upper portion thereof, the filter permits trapping of sediment therein.

As previously stated, the spiral filter is formed of a ribbon 32 on which is secured a biocidal material 34. Preferably, ribbon 32 is made of a very thin sheet of polyethylene, with a thickness in the range of approximately 0.030 inch. Ribbon 32 may be, for instance, a sheet of polyethylene having dimensions of approximately 8 ft by approximately 3 inches, such that when ribbon 32 is wound, the total diameter of the spiral filter 30 is approximately 4½ inches.

The biocidal material 34 may be a copper-zinc alloy sold by KDF Fluid Treatment, Inc. under the trade name "KDF-55." KDF-55 is a pesticidal device certified by the Environmental Protection Agency. KDF-55 has been found to be effective in removing heavy metals from water. It is believed that this is achieved by an exchange of ions resulting from an oxidation reduction process, such that heavy metals in the water attach to the zinc/copper complex of the KDF-55 media as the water passes therethrough. Such media, when used by itself, is also believed to be slightly bacteriocidal. Alternatively, biocidal material 34 may be iodine, a biocide known to function by destroying the outer cell wall of the microorganism when it comes in contact with the biocide for a sufficient length of time. Biocidal material 34 may also be any other resin such as an ion exchange resin.

Figure 5:
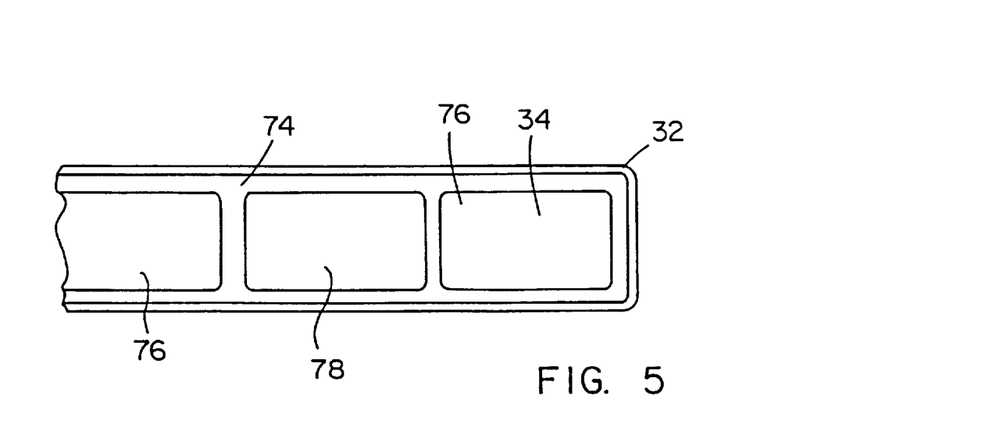
FIG. 5 is a schematic view of the ribbon of the filtration device.

A preferred alternative is to alternate KDF with iodine, as depicted in FIG. 5. Referring to FIG. 5, ribbon 32 is depicted in its unwound configuration. An adhesive 74 is applied to ribbon 32, either continuously along ribbon 32 or in strips. Adhesive 74 is preferably a quick setting epoxy and/or an FDA certified epoxy, such as that made by Masterbond, Inc., of Hackensack, N.J., and sold as EP21LV, EP30, or EP75. KDF and iodine are then secured to ribbon 32 by adhesive 74 in alternating strips 76, 78. One possible configuration is to provide one of each strip 76, 78, in which case each strip 76, 78 might cover approximately one-half of the length of ribbon 32, to provide a single reduction-oxidation cycle as discussed below. Another possible configuration is to provide multiple strips 76, 78, repeatedly alternating, as depicted in FIG. 5. While providing strips 76, 78 covering approximately one-half of the length of ribbon 32 has proven successful by exposing microbes to a single reduction-oxidation cycle, the configuration depicted in FIG. 5 is advantageous when making smaller filters, since it increases the number of reduction-oxidation cycles to which the microbes are exposed. To provide a greater concentration of biocidal material 34, it may be advantageous to apply the adhesive and resin to both sides of ribbon 32.

It is preferred that ribbon 32 be wound tightly enough to allow ready flow and adequate purification, either spirally to form spiral filter 30 or helically to form helical filter 80, such that the coils of the ribbon are separated by as little as the thickness of the biocidal material disposed thereon. In other words, only the biocidal material 34 limits contact of one coil of the ribbon with the adjacent coils. This is advantageous for several reasons. First, it permits utilization of a lengthy ribbon, thus ensuring that the water travels a prolonged path of contact with the biocidal material. Additionally, the tightness of the coils permits only a small amount of water to traverse the space between the coils, thus guaranteeing that the water and its contaminants are exposed closely to the biocidal material as the water flows through the spiral filter. If it is desired to improve the flow rate of water through the filter, spacer beads may be inserted between adjacent coils of the ribbon.

Spiral filter 30 may optionally be manufactured by winding ribbon 32 into a spiral structure, and spraying or otherwise inserting the resin into the structure.

Yet another alternative for manufacturing ribbon 32 is to utilize a flexible, thin polyethylene tube, sprayed with adhesive on the inner surface. The tube may be filled with biocidal material 34 so that the resin adheres to the adhesive. After the excess resin is released from the tube, the tube may be collapsed and then wound to form the spiral or helical shape.

An annular holding chamber 50 is formed between spiral filter 30 and the inside surface 52 of housing 11. A plurality of outlet holes 54 are provided, preferably spaced about the outside circumferential edge of lower surface 42. Alternatively, lower surface 42 may be a porous membrane. Water flowing out of spiral filter 30 is held in holding chamber 50 to provide an additional contact time with any biocide that may have dissolved, until the water exits to lower chamber 16 via outlet holes 54.

Referring to FIG. 4, lower chamber 16 includes a plurality of cylindrical or disk-shaped filter elements contained within housing 11. Specifically, a diffuser screen 62 is positioned directly beneath lower surface 31 of upper chamber 14. Diffuser screen 62 is made of porous polyethylene and distributes the water which entered lower chamber 16 via the circumferential outlet holes 54 along the entire surface area of diffuser screen 62 to provide a more even distribution of the water flowing through lower chamber 16.

A volume of filtration media 64, bounded on both sides by upper and lower porous separator disks 66, 68, is disposed underneath diffuser screen 62. Filtration media 64 is preferably activated charcoal with ion exchange beads or other materials, and thus is effective in removing lead and other heavy metals as well as iodine that may have been used in the spiral filter, chlorine, pesticide, and organics. Ion exchange material may also act as an agent for water softening.

A cyst membrane 70, made of polycarbonate and being extremely thin, is positioned beneath lower separator disk 68 and protected by a porous disk 72. Cyst membrane 70 is held in place against disk 72 by a retention ring 71, positioned on top of and cemented to cyst membrane 70. The membrane is manufactured by a process of radiation followed by acid etching which creates pore sizes of a specified diameter. Preferably, the pore sizes are of a diameter of 3 microns or less. These pore sizes permit fluid to flow at a rate unaffected by the cyst membrane. One example of a suitable cyst membrane is manufactured by Poretics. Cyst membrane 70 removes cysts such as *Giardia lamblia* from the water by filtration.

Depending on design factors, such as the type of outlet 18 desired, porous disk 72 may be a component separated from the lower surface 11c of housing 11, as depicted in FIG. 4. This configuration provides enough space for outlet 18 to be in the form of a hole secured to an outlet tube, as previously described with reference to FIG. 1. Alternatively, porous disk 72 may form the lower surface 11c of housing 11. In this configuration, the plurality of outlet holes 24 may be formed in porous disk 72. This configuration is advantageous in conserving space in the filtration device.

Water entering lower chamber 16 via outlet holes 54 enters diffuser screen 62 and is distributed along the entire surface area of diffuser screen 62. The water flows through upper separator disk 66, filtration media 64, lower separator disk 68, cyst membrane 70, and finally porous disk 72 before exiting filtration device 10 at outlet 18.

The housing, including outer circumferential wall 11a and upper and lower surfaces 11b, 11c, may be formed of any suitable material approved by the EPA or FDA for contact with potable water, such as polyethylene.

The spiral or helical filter 30, 80, described above, provides a unique and advantageous reduction-oxidation cycle. Utilized alone, the KDF-55 biocidal resin removes lead and other heavy metals, chlorine, pesticides, and organics, and reduces the quantity of bacteria. Iodine is typically used to destroy viruses. However, when used in sequence, the KDF-55 coupled with the iodine produces a unique reduction/oxidation cycle which has been found to significantly reduce the concentration of bacteria and viruses.

During the reduction/oxidation process, water flowing in intimate contact with the KDF-55 particles is reduced, i.e., the electrons in the biological organisms are increased. Because iodine tends to have an affinity for electrons, the fluid contacting the iodine is oxidized, i.e., the biological organisms lose electrons. Biological organisms are sensitive, and their reduction/oxidation states are maintained by delicate balances. Excessive reduction or oxidation destroys a significant portion of proteins found in the organisms. It is theorized that while bacteria and viruses can tolerate gradual changes in their reduction/oxidation environment, the cycling of reduction and oxidation provided by the spiral filter is more difficult for the organism to contend with. Thus, exposing the bacteria to KDF-55 and sequentially to an oxidation process stimulated by the iodine enhances the killing of bacteria.

It further is theorized that the spiral flow pattern of water in the spiral filter creates an electrical field, enhancing the killing of bacteria and exerting an electrostatic separation affect to pull contaminant particles, including cysts, out of suspension in the water. More specifically, as stated previously, the spiral or helical coil filter element may be wound spirally or helically in either a clockwise or counterclockwise direction. Since an electrical potential develops over the length of the fluid flow path as the fluid is flowing, a second axially oriented electrical field develops when the flow path is spiral or helical. Using the right hand rule of electrical field forces, electron movement in a spiral direction imposes a force oriented in the axial direction on any charged particle, be it a bacterium, virus, cyst or other charged particulate impurity suspended in the liquid to be purified. Depending on the direction of fluid flow through the spiral or helical filter, i.e., clockwise or counterclockwise, the force on any charged particle in suspension may be in the direction of the fluid inlet or the fluid outlet. This secondary electrical field acts to push any charged particulate to one edge or the other of the fluid channel, the actual direction of movement of the particle depending on the field orientation and the charge of the particle. Thus, by varying the direction of fluid flow, through either a clockwise or counter-clockwise spiral or helix, the desired effect can be realized. It is further within the scope of this invention to place clockwise and counterclockwise spiral or helical filters in series to take advantage of the respective purification effect of each filter on positively and negatively charged particles in suspension. Thus, the filter of the present invention embodies a physical principle of electrostatic separation that makes it uniquely capable of removing from suspension any charged particulate, such as bacteria, viruses or parasite cysts. Further, this separation effect increases as the flow rate of fluid through the filter increases, because the electrical field is magnified in direct proportion to the flow rate, making this filter design extremely suitable for in-line, high-flow applications.

Similarly, it will be appreciated by one skilled in the art that a smaller filter will provide a shortened flow path, thereby reducing the electrostatic separation effect of the filter. Thus, in a smaller filter, it is preferred that multiple reduction-oxidation cycles be provided by utilizing the multiple alternating strips 76, 78 of KDF and iodine as depicted in FIG. 5 to offset the loss of the electrostatic separation effect in a smaller filter.

A prototype device, as described above, has been extensively tested to determine the potential of the device to serve as a microbiological water purifier. The results of this testing have been exceptional. The testing system used was modeled as close as possible to the specifications contained in the EPA document, "Guide Standard and Protocol for Testing Microbiological Water Purifiers," the contents of which are incorporated herein by reference. The test water used was deionized Detroit city water that was reconstructed by the addition of AOAC Synthetic hard water to achieve the defined chemical properties of "general test water," as described in the above-identified document. Specifically, the chemical properties of the water included: pH of $7.5\pm0.5$; TOC$\leq$5 ppm; turbidity $\leq$1 NTU; temperature of $21\pm1°$ C.; and TDS of 320 ppm.

The device was challenged with 5 gallons of test water per day for 30 test days, or a total challenge of 100 gallons. The test water was pumped through the inlet of the device at a rate of 100 ml per minute. The unit was tested for 16 hours per test day, with an 8 minute "on" and 32 minute "off" cycle. Although the testing protocol for pour-through type units is not clearly defined in the EPA document, the testing protocol for this device, described below, is believed to be a rigorous challenge of the unit at its estimated capacity of 100 gallons.

The test water included the bacteria *Klebsiella terrigena* (ATCC #33257) at a concentration greater than $1\times10^7$ cfu/100 ml, with the total challenge over the course of the test approaching $1\times10^{12}$. The required log reduction for the EPA Protocol is 6 logs ($1\times10^5$ per ml to less than 1 per 10 ml). The influent and effluent concentration was measured once each test day.

The bacterial virus Q-Beta was used as a model of animal viruses such as Poliovirus. The capsid of the bacteriophage Q-Beta is 25 nanometers in diameter and is ideal for testing filtration of Poliovirus. Poliovirus is a member of the virus family Piconaviridae and the size range of the over 200 animal viruses in this family is 24 to 30 nanometers. Simian Rotavirus (the other virus required in the EPA Protocol) is 80 nanometers in diameter and thus should easily be removed by a device that removes Q-Beta.

The testing of Q-Beta was similar to the periodic challenge used in the EPA Protocol. The device was challenged 10 times during the 20 day test period at a concentration of greater than the $1\times10^5$ virus/ml (10 times that required in the EPA Protocol for Poliovirus and Rotavirus). The required virus reduction in the EPA protocol is 4 logs ($1\times10^4$ per ml to less than 1 per ml). The virus concentration (pfu/ml or plaque forming units) in the influent and effluent water was measured using the Q-Beta host *Escherichia coli*.

The ability of the unit to remove protozoan cysts was tested using oocysts of the human pathogen *Cryptosporidium parvum*. The unit was challenged 5 times during the 20 day test with a concentration of from $4.7\times10^5$ to $7.3\times10^5$ oocysts per liter. The limit of detection using a fluorescent staining procedure was 300 oocysts per liter in the effluent water. The required reduction of protozoan cysts by the EPA Protocol is three logs, yet, the filter yields no detectable oocysts in the effluent. This makes the filter's reduction efficacy 3–5 logs.

The results of the testing are set forth in Appendix A. Referring to Table 1, there were no detectable survivors of the bacterium *Klebsiella terrigena* during each of the 20 test runs for an average log reduction of greater than 8 logs. This reduction is at least two logs greater than is required by the EPA Protocol and clearly indicates that this device can be safely used to remove potentially pathogenic bacteria from drinking water.

The reduction of the bacterial virus A-Beta and the pathogenic protozoan *Cryptosporidium parvum* were also equally impressive. As seen in Table 2 of Appendix A, the bacterial virus used as a model of Poliovirus was reduced greater than 6 logs, and the *Cryptosporidium parvum* oocysts were reduced at least by 3 logs (Table 3) and the limits of the test system were exceeded by approximately 2 logs, indicating a 3–5 log reduction of parasite cysts.

These test results meet or exceed the results required by the EPA, as set forth in the Protocol document. Accordingly, the device of the present invention has been proven to safely purify water of unknown quality.

In summary, the water filtering device described herein provides significant advantages over the filters of the prior art. The reduction-oxidation cycle provided by the spiral filter is uniquely effective in bacterial reduction, as evidenced by the disclosed test results. The combination of the spiral filter with biocidal material, the bed of filtration media, and the cyst membrane significantly reduces or eliminates the potentially toxic organisms commonly found in water.

It will become apparent to one of ordinary skill in the art that the water filtering device described above may be modified, for instance, by providing a conventional layered filter, either concentrically or horizontally layered, rather than the spiral or helical filter described herein. As with the spiral filter, such a layered filter would provide a lengthy path of water flow to significantly increase contact time with the biocidal material disposed within. Such a layered filter may also provide a reduction-oxidation cycle, as described herein. Such modifications are intended to be within the scope of the present invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

APPENDIX A

TABLE 1

Bacterial Reduction: *Klebsiella terrigena* (ATCC # 33257)

| Run Day | Flow Rate (ml/ml) | Influent (cfu/100 ml) | Effluent (cfu/100 ml) | Log Reduction |
|---|---|---|---|---|
| 1 | 100 | $8.1 \times 10^7$ | * | 7.9 |
| 2 | 99 | $2.2 \times 10^8$ | * | 8.3 |
| 3 | 104 | $1.5 \times 10^8$ | * | 8.2 |

TABLE 1-continued

Bacterial Reduction: *Klebsiella terrigena* (ATCC # 33257)

| Run Day | Flow Rate (ml/ml) | Influent (cfu/100 ml) | Effluent (cfu/100 ml) | Log Reduction |
|---|---|---|---|---|
| 4 | 98 | $2.4 \times 10^8$ | * | 8.4 |
| 5 | 100 | $2.2 \times 10^8$ | * | 8.3 |
| 6 | 101 | $6.6 \times 10^7$ | * | 7.6 |
| 7 | 100 | $2.5 \times 10^8$ | * | 8.4 |
| 8 | 103 | $3.2 \times 10^8$ | * | 8.5 |
| 9 | 100 | $2.2 \times 10^8$ | * | 8.3 |
| 10 | 99 | $2.9 \times 10^8$ | * | 8.5 |
| 11 | 100 | $3.0 \times 10^8$ | * | 8.5 |
| 12 | 99 | $2.6 \times 10^8$ | * | 8.4 |
| 13 | 100 | $2.1 \times 10^8$ | * | 8.3 |
| 14 | 100 | $3.2 \times 10^8$ | * | 8.5 |
| 15 | 100 | $3.4 \times 10^8$ | * | 8.5 |
| 16 | 97 | $3.9 \times 10^8$ | * | 8.6 |
| 17 | 94 | $2.8 \times 10^8$ | * | 8.5 |
| 18 | 100 | $3.4 \times 10^8$ | * | 8.5 |
| 19 | 101 | $3.8 \times 10^8$ | * | 8.6 |
| 20 | 100 | $2.5 \times 10^8$ | * | 8.4 |
| Average | 100 | $2.6 \times 10^8$ | * | 8.4 |

* = Limit of Detection: Less than 1 cfu per 100 ml.

TABLE 2

Virus Reduction: Bacterial Virus O-Beta (ATCC #23631-B1)

| Run Day | Flow Rate (ml/ml) | Influent (pfu/ml) | Effluent (pfu/ml) | Log Reduction |
|---|---|---|---|---|
| 1 | 100 | $8.5 \times a0^5$ | * | 5.9 |
| 3 | 104 | $2.3 \times 10^6$ | * | 6.4 |
| 5 | 100 | $8.6 \times 10^5$ | * | 5.9 |
| 7 | 100 | $4.5 \times 10^5$ | * | 5.7 |
| 9 | 100 | $2.4 \times 10^6$ | * | 6.4 |
| 11 | 100 | $1.0 \times 10^6$ | * | 6.0 |
| 13 | 100 | $1.0 \times 10^6$ | * | 6.0 |
| 16 | 97 | $1.0 \times 10^6$ | * | 6.0 |
| 17 | 94 | $1.1 \times 10^6$ | * | 6.0 |
| 19 | 101 | $3.4 \times 10^6$ | * | 6.5 |
| Average | 100 | $1.4 \times 10^6$ | * | 6.1 |

* = Limit of Detection: Less than 1 pfu per ml.

TABLE 3

Cyst Reduction: *Cryptosporidium parvum*

| Run Day | Flow Rate (ml/ml) | Influent (oocysts/liter) | Effluent (oocysts/liter) | Log Reduction |
|---|---|---|---|---|
| 7 | 100 | $7.3 \times 10^5$ | * | $\geq 3.4$ |
| 9 | 100 | $4.7 \times 10^5$ | * | $\geq 3.2$ |
| 11 | 100 | $5.7 \times 10^5$ | * | $\geq 3.3$ |
| 17 | 94 | $4.6 \times 10^5$ | * | $\geq 3.2$ |
| 18 | 100 | $6.1 \times 10^5$ | * | $\geq 3.3$ |
| Average | 100 | $1.4 \times 10^5$ | * | $\geq 3.3$ |

* = Limit of Detection: Less than 300 oocysts per liter.

I claim:
1. A filter for purifying water, the filter comprising:
a housing including an inlet through which the water is received and an outlet;
a spiral filter structure including a ribbon spirally wound to form a central hollow core and an exit at the exterior thereof, the ribbon including a first biocidal material and a second biocidal material contained therein, the inlet directing the liquid through the spiral structure via the central core, the water exiting the spiral structure at the exit;
an annular holding chamber disposed between the spiral filter structure and the housing and adapted to receive water exiting the spiral structure, the annular holding chamber including a plurality of outlet holes;

a volume of filtration media through which the water is passed upon exiting the holding chamber through the plurality of outlet holes, the water flowing in contact with the filtration media and exiting the housing via the outlet.

2. The filter of claim 1, wherein the biocidal material includes a copper-zinc alloy and iodine, the copper-zinc alloy and iodine being repeatedly alternatingly secured to the ribbon.

3. The filter of claim 1, wherein the biocidal material includes a copper-zinc alloy and iodine, the copper-zinc alloy being secured to approximately half of the ribbon and the iodine is secured to a remainder of the ribbon.

4. The filter of claim 1, wherein a lower portion of the exterior of the spiral filter structure forming the exit is sealed to the spiral filter structure such that the spiral filter structure forms a sediment trap.

5. The filter of claim 1, further comprising a cyst membrane formed of a porous material.

6. The filter of claim 5, further comprising a porous support disk and a retention ring for supporting the cyst membrane, the cyst membrane being disposed beneath and cemented to the retention ring and disposed above the support disk.

7. A filter for purifying a liquid, the filter comprising:

a housing including an inlet through which the liquid is received and an outlet;

a filter structure including a coiled structure having a first biocidal material and a second biocidal material secured thereto, the filter structure being adapted to receive liquid from the inlet and to permit substantially all the liquid to travel along substantially the entire length of the coiled structure in extended intimate contact with the first and second biocidal materials, the filter structure including an exit for directing liquid from the filter structure;

a holding chamber adapted to receive liquid from the exit, the holding chamber including a plurality of outlet holes;

a volume of filtration media through which the liquid is passed, the liquid entering the volume of filtration media through the plurality of outlet holes.

8. The filter of claim 7, wherein the coiled structure is in a spiral configuration.

9. The filter of claim 7, wherein the coiled structure is in a helical configuration.

10. The filter of claim 7, further comprising a cyst membrane formed of a porous material, the cyst membrane located beneath the volume of filtration media.

11. The filter of claim 7, wherein the biocidal material includes a copper-zinc alloy and iodine, copper-zinc alloy and iodine being repeatedly alternatingly secured to the ribbon.

12. The filter of claim 7, wherein the biocidal material includes a copper-zinc alloy and iodine, the copper-zinc alloy being secured to approximately half of the ribbon and the iodine is secured to a remainder of the ribbon.

13. The filter of claim 7, wherein internal walls of said coiled structure are lined with said first and second biocidal materials.

14. A method for treating water comprising:

introducing the water into a filter such that the water transverses a spiral or helically arranged channel in intimate contact with at least one cycle of first and second biocidal materials bonded to walls of said channel; and routing the liquid from the filter.

15. The method of claim 13, wherein the first and second biocidal materials are selected to provide a reduction-oxidation cycle.

16. The method of claim 14, wherein the channel is provided by utilizing a spiral filter structure including a ribbon spirally wound to form a central hollow core and an exit at the exterior thereof, the first and second biocidal materials being held in place by the ribbon, the liquid entering the filter at the central core and exiting the spiral filter structure at the exit to enter the holding chamber.

17. The method of claim 14, wherein the channel is provided by utilizing a coiled filter structure including a ribbon helically wound and including an inlet and an exit at the exterior thereof, the first and second biocidal materials being held in place by the ribbon, the liquid entering the filter at the inlet and exiting the spiral filter structure at the exit to enter the holding chamber.

18. A method for treating water comprising:

introducing the water into a filter such that the liquid traverses a spiral or helically arranged channel in intimate contact with at least one cycle of first and second biocidal materials bonded to walls of said channel; and routing the liquid from the filter, further comprising the step of passing the liquid through a cyst membrane.

19. A method for treating water comprising:

introducing the water into a filter such that the liquid traverses a spiral or helically arranged channel in intimate contact with at least one cycle of first and second biocidal materials bonded to walls of said channel; and routing the liquid from the filter, wherein the first and second biocidal materials are selected to provide a reduction-oxidation cycle, wherein the first and second biocidal materials are a copper-zinc alloy and iodine.

20. A reduction-oxidation method for killing biological organisms, comprising the steps of:

(a) putting first and second biocidal materials by bonding said first and second materials to liquid impermeable walls which are adapted to form a spirally or helically arranged channel;

(b) exposing the biological organisms to the first biocidal material for a period of time, the first biocidal material increasing the number of electrons associated with the biological organisms;

(c) exposing the biological organisms to the second biocidal material for a period of time, the second biocidal material decreasing the number of electrons in the biological organisms;

wherein the cyclical increase and decrease in the number of electrons in the biological organisms kills the biological organisms.

21. The method of claim 20, wherein said liquid traverses through the channel in intimate contact with at least said one cycle of first and second biocidal materials lining the channel walls.

22. A reduction-oxidation method for killing biological organisms contained in a fluid with a first and second biocidal materials by bonding said first and second materials to walls which are adapted to form a spirally or helically arranged channel, comprising the steps of;

(a) passing the fluid through said channel and exposing the biological organisms to the first biocidal material for a period of time, the first biocidal material increasing or decreasing the number of electrons associated with the biological organisms; and in said channel (b) exposing the biological organisms to the second biocidal material for a period of time, the second material decreasing or increasing the number of electrons in the biological organisms;

wherein the cyclical increase and decrease in the number of electrons in the biological organisms kills the biological organisms, wherein the first biocidal material is a copper-zinc alloy, and the second biocidal material is iodine.

23. A filter for purifying a liquid, comprising:

(a) a filter container having an inlet and an outlet and a longitudinal axis extending therebetween;

(b) said filter having an elongate channel arranged in a predetermined geometric configuration; and (c) a filter material disposed in said channel, wherein substantially entirely all of said filter material is adhered to interior liquid impermeable walls of said channel.

24. The filter of claim 23, wherein said filter material includes a first biocidal material and a second biocidal material arranged in alternating sequence to each other within said channel.

25. The filter of claim 24, wherein said channel is arranged in a spiral configuration.

26. The filter of claim 24, wherein said channel is arranged in a helical configuration.

27. The filter of claim 1, wherein internal walls of said ribbon are lined with said first and second biocidal materials.

28. The filter of claim 23, wherein said filter material is adhesively secured to the interior walls of said channel.

29. A method for treating water comprising:

introducing the water into a filter such that the liquid traverses a spiral or helically arranged channel in intimate contact with at least one cycle of first and second biocidal materials bonded to walls of said channel; and, wherein said liquid contacts, in said channel, with a plurality of alternating regions of said first and second biocidal materials disposed along the length of said channel.

30. A filter for purifying a liquid, comprising:

(a) a filter container having an inlet and an outlet and a longitudinal axis extending therebetween;

(b) said filter having an elongate channel arranged in a predetermined geometric configuration; and (c) a filter material having biocidal particles disposed in said channel, wherein substantially entirely all of said filter material is adhered to interior walls of said channel, wherein opposing side walls of the channel are closely spaced from each other by a distance equal to the thickness of the individual particles of the filter material.

31. A filter adapted for placement in a pitcher for purifying water flowing through the filter under the influence of gravity only, comprising a housing including an inlet through which the water is received and an outlet;

a porous cyst removal structure disposed in said housing and having a pore size operable to remove cysts and not bacteria from said water under gravity fed, pour through use condition only;

a mounting structure operatively connected to said housing to mount the porous cyst removal structure to the pitcher; and a reservoir mounted to said housing, said reservoir being open to allow variable amounts of water to be contained within said reservoir for purification by said filter.

32. The filter of claim 31, wherein said porous removal structure is effective to achieve a greater than 99% reduction of cysts.

33. The filter of claim 31, wherein said porous structure is a porous membrane.

34. The filter of claim 33, wherein said membrane has pore sizes of 1–3 microns.

35. The filter of claim 34, wherein said membrane has pore sizes of about 3 microns.

36. The filter of claim 33, wherein said membrane is a flat porous member.

37. The filter of claim 33, wherein said membrane is an acid etched membrane creating pore sizes of a specified diameter.

38. A reduction-oxidation method for killing biological organisms, comprising the steps of:

(a) putting first and second biocidal materials by bonding said first and second materials to walls which are to form liquid impermeable channel walls of a channel having a predetermined geometric configuration;

(b) exposing the biological organisms to the first biocidal material for a period of time, the first biocidal material increasing (or decreasing) the number of electrons associated with the biological organisms;

(c) exposing the biological organisms to the second biocidal material for a period of time, the second biocidal material decreasing (or increasing) the number of electrons in the biological organisms.

39. A filter for purifying a liquid, comprising:

(a) a filter container having an inlet and an outlet and a longitudinal axis extending therebetween;

(b) said filter having an elongate channel arranged in a predetermined geometric configuration; and (c) a filter material disposed in said channel, wherein substantially an entire surface of the interior liquid impermeable walls of said channel has the filter material adhered to it.

40. A method for removal of cysts from a liquid, comprising the steps of:

a) placing a filter into communication with a supply of liquid from which cysts are to be removed, said filter including a porous cyst removal structure having pore sizes operable to trap cysts from the liquid flowing through the structure; and b) directing said supply of liquid into said filter under gravity fed pressure only such that said porous cyst removal structure is effective to remove cysts from said liquid under non-pressure and only gravity operated influence, wherein said filter is mounted to an open reservoir in communication with said supply of liquid.

41. The method of claim 40, wherein said filter is mounted atop a water pitcher.

* * * * *